(12) United States Patent
Kikkawa et al.

(10) Patent No.: US 12,515,647 B2
(45) Date of Patent: Jan. 6, 2026

(54) DRIVING ASSISTANCE APPARATUS, VEHICLE, AND NON-TRANSITORY RECORDING MEDIUM

(71) Applicant: SUBARU CORPORATION, Tokyo (JP)

(72) Inventors: Ryo Kikkawa, Tokyo (JP); Yui Niizeki, Tokyo (JP); Hideyuki Takao, Tokyo (JP); Shumpei Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 73 days.

(21) Appl. No.: 18/656,767

(22) Filed: May 7, 2024

(65) Prior Publication Data

US 2024/0286606 A1 Aug. 29, 2024

Related U.S. Application Data

(63) Continuation of application No. PCT/JP2022/035366, filed on Sep. 22, 2022.

(51) Int. Cl.
*B60W 30/09* (2012.01)
*B60W 40/10* (2012.01)

(52) U.S. Cl.
CPC ............ *B60W 30/09* (2013.01); *B60W 40/10* (2013.01); *B60W 2540/223* (2020.02); *B60W 2720/24* (2013.01)

(58) Field of Classification Search
CPC ....... B60W 2540/223; B60W 2720/24; B60W 40/10; B60W 30/09; B60W 30/08; G08G 1/16
See application file for complete search history.

(56) References Cited

U.S. PATENT DOCUMENTS

| | | | | |
|---|---|---|---|---|
| 8,035,575 B2 * | 10/2011 | Okabe | | B60Q 9/008 |
| | | | | 340/937 |
| 2008/0239527 A1 * | 10/2008 | Okabe | | B60R 1/25 |
| | | | | 359/843 |

FOREIGN PATENT DOCUMENTS

| | | |
|---|---|---|
| JP | 2008-217360 A | 9/2008 |
| JP | 2014-101023 A | 6/2014 |
| JP | 2019-200464 A | 11/2019 |

OTHER PUBLICATIONS

International Search Report issued in the International Application No. PCT/JP2022/035366 on Nov. 29, 2022, w/ English Translation.

* cited by examiner

*Primary Examiner* — Tarek Elarabi
(74) *Attorney, Agent, or Firm* — Rimon P.C.

(57) ABSTRACT

A driving assistance apparatus includes one or more processors. The one or more processors set a merging middle position based on information regarding a position of a head of a driver and information regarding an entry road and a merging road. The merging middle position is a position at which a region becomes viewable from the driver. The region is a blind spot from the driver of a vehicle traveling on the entry road. The blind spot is caused by a blind spot forming object present on a turning outer side of the vehicle. The one or more processors set a path that allows an inclination to be a predetermined angle or less at the merging middle position. The inclination is an inclination of a viewing angle center line of the driver viewing the region having been the blind spot with respect to a front-rear direction of the vehicle.

7 Claims, 15 Drawing Sheets

DRIVING ASSISTANCE APPARATUS, VEHICLE, AND NON-TRANSITORY RECORDING MEDIUM

CROSS REFERENCES TO RELATED APPLICATIONS

This application is continuation of International Application No. PCT/JP2022/035366, filed on Sep. 22, 2022, the entire contents of which are hereby incorporated by reference.

BACKGROUND

The disclosure relates to a driving assistance apparatus, a vehicle, and a non-transitory recording medium.

Various techniques are proposed to achieve safe traveling on a poor visibility road. For example, Japanese Unexamined Patent Application Publication (JP-A) No. 2008-217360 discloses a technique of presenting a position at which contact between an own vehicle and an intersection corner is avoidable, and achieving a maximum steering angle at the presented position to allow the vehicle to pass an intersection. Japanese Unexamined Patent Application Publication (JP-A) No. 2014-101023 discloses a technique of, when an own vehicle path is estimated to come into contact with an intersection corner, moving an own vehicle position away from a wall surface on a turning inner side to prevent the contact and suppressing expansion into an outer side. Japanese Unexamined Patent Application Publication (JP-A) No. 2019-200464 discloses a technique of controlling a position of an own vehicle and an attitude of the own vehicle when the own vehicle stops before merging so that a blind spot from an in-vehicle sensor is reduced when the own vehicle turns at an intersection. The blind spot from the in-vehicle sensor is caused by a surrounding obstacle.

SUMMARY

An aspect of the disclosure provides a driving assistance apparatus configured to assist driving of a vehicle when the vehicle travels from an entry road, turns at a crossroad or a T-intersection, and travels into a merging road. The driving assistance apparatus includes one or more processors and one or more memories. The one or more memories are communicably coupled to the one or more processors. The one or more processors are configured to set a merging middle position based on information regarding a position of a head of a driver of the vehicle and information regarding the entry road and the merging road. The merging middle position is a position at which a region becomes viewable from the driver of the vehicle. The region is a blind spot from the driver of the vehicle traveling on the entry road. The blind spot is caused by a blind spot forming object present on a turning outer side of the vehicle. The one or more processors are configured to set a path for the vehicle that allows an inclination to be less than or equal to a predetermined angle at the merging middle position. The inclination is an inclination of a viewing angle center line of the driver viewing the region having been the blind spot with respect to a front-rear direction of the vehicle.

An aspect of the disclosure provides a vehicle including a driving assistance apparatus. The driving assistance apparatus is configured to assist driving of the vehicle when the vehicle travels from an entry road, turns at a crossroad or a T-intersection, and travels into a merging road. The driving assistance apparatus includes one or more processors and one or more memories. The one or more memories are communicably coupled to the one or more processors. The one or more processors are configured to set a merging middle position based on information regarding a position of a head of a driver of the vehicle and information regarding the entry road and the merging road. The merging middle position is a position at which a region becomes viewable from the driver of the vehicle. The region is a blind spot from the driver of the vehicle traveling on the entry road. The blind spot is caused by a blind spot forming object present on a turning outer side of the vehicle. The one or more processors are configured to set a path for the vehicle that allows an inclination to be less than or equal to a predetermined angle at the merging middle position. The inclination is an inclination of a viewing angle center line of the driver viewing the region having been the blind spot with respect to a front-rear direction of the vehicle.

An aspect of the disclosure provides a non-transitory tangible computer readable recording medium containing a computer program to be applied to a driving assistance apparatus. The driving assistance apparatus is configured to assist driving of a vehicle when the vehicle travels from an entry road, turns at a crossroad or a T-intersection, and travels into a merging road. The computer program causes, when executed by one or more processors, the one or more processors to implement a method. The method includes: setting a merging middle position based on information regarding a position of a head of a driver of the vehicle and information regarding the entry road and the merging road, the merging middle position being a position at which a region becomes viewable from the driver of the vehicle, the region being a blind spot from the driver of the vehicle traveling on the entry road, the blind spot being caused by a blind spot forming object present on a turning outer side of the vehicle; and setting a path for the vehicle that allows an inclination to be less than or equal to a predetermined angle at the merging middle position, the inclination being an inclination of a viewing angle center line of the driver viewing the region having been the blind spot with respect to a front-rear direction of the vehicle.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
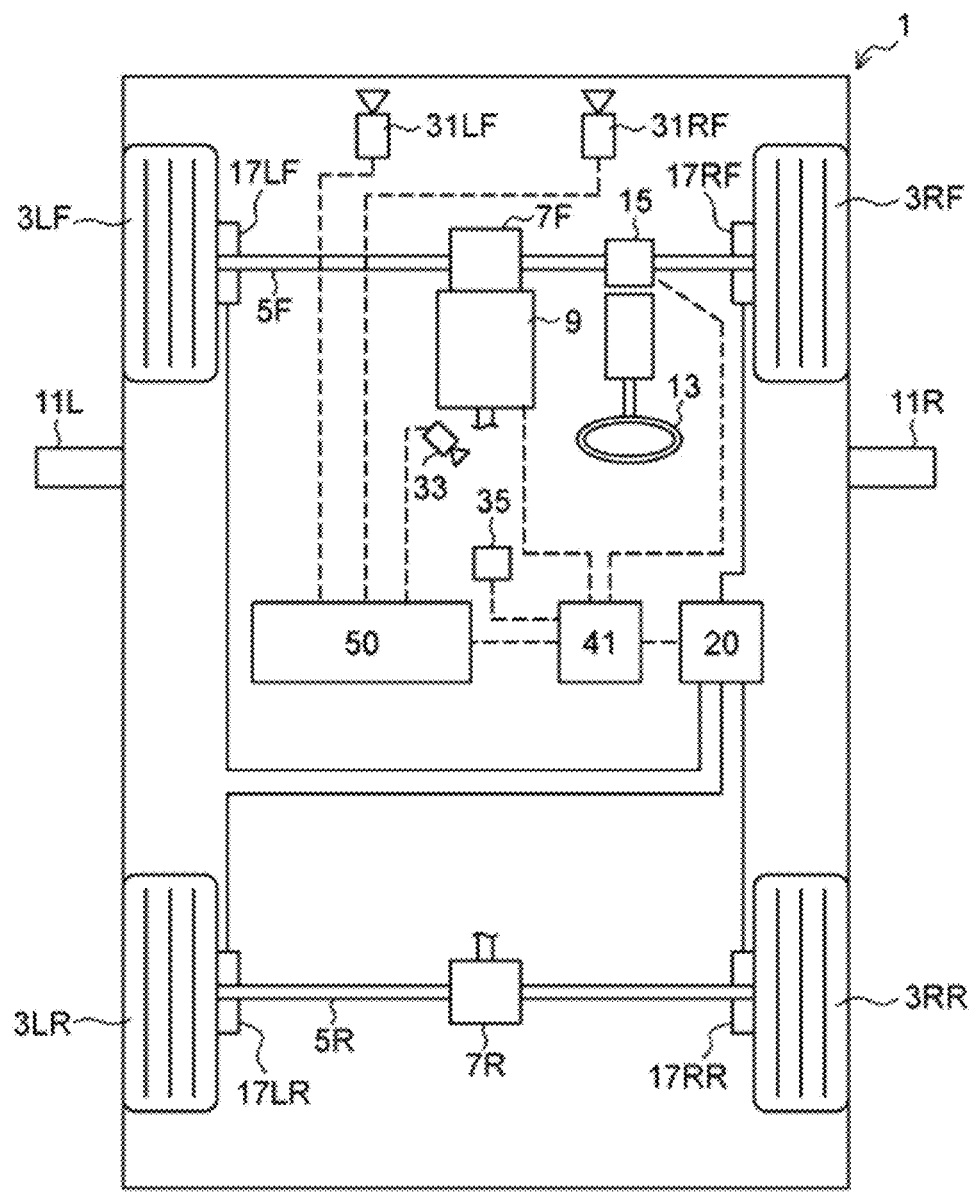
FIG. 1 is a schematic diagram illustrating a configuration example of a vehicle including a driving assistance apparatus according to one example embodiment of the disclosure.

Techniques disclosed in JP-A Nos. 2008-217360 and 2014-101023 attempt to achieve smooth passing by preventing a vehicle from coming into contact with an intersection corner and from expanding to an outer side, but do not take into consideration a reduction in blind spot. Accordingly, for example, when the vehicle enters an intersecting road into which the vehicle is to merge while a direction of the vehicle being orthogonal to the intersecting road, a pillar of the vehicle can block a field of view, which can result in poor visibility. A technique disclosed in JP-A No. 2019-200464 does take into consideration the reduction in blind spot from a sensor. However, an attempt to minimize the blind spot from the sensor results in an increase in an angle of a vehicle body with respect to the intersecting road into which the vehicle is to merge. This can make a driver turn greatly to the right or make the driver twist his or her body when the driver checks an approaching object upon merging into the intersecting road. As a result, the driver cannot pay enough attention to the front (to a region in a traveling direction), which can cause inconvenience in merging into the intersecting road.

It is desirable to provide a driving assistance apparatus, a vehicle, and a non-transitory recording medium that each make it possible to allow a vehicle to safely merge into a road while preventing the vehicle from coming into contact, preventing the vehicle from entering into an opposing lane, and preventing an increase in turning amount of a line of sight.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[1. Overall Configuration of Vehicle]

FIG. 1 is a schematic diagram illustrating a configuration example of a vehicle 1 including a driving assistance apparatus 50 according to an example embodiment of the disclosure. The vehicle 1 illustrated in FIG. 1 may be configured as a four-wheel drive vehicle that transmits driving torque to a left-front wheel 3LF, a right-front wheel 3RF, a left-rear wheel 3LR, and a right-rear wheel 3RR. In the following, the left-front wheel 3LF, the right-front wheel 3RF, the left-rear wheel 3LR, and the right-rear wheel 3RR may be collectively referred to as "wheels 3" unless a distinction is to be made between them. The driving torque may be outputted from a driving force source 9 that generates the driving torque for the vehicle 1. The driving force source 9 may be an internal combustion engine such as a gasoline engine or a diesel engine, or may be a driving motor. The driving force source 9 may include both an internal combustion engine and a driving motor.

Note that the vehicle 1 may be an electric vehicle including two driving motors, e.g., a front wheel driving motor and a rear wheel driving motor, or may be an electric vehicle including driving motors that correspond to the respective wheels 3. When the vehicle 1 is an electric vehicle or a hybrid electric vehicle, a secondary battery and a generator may be mounted on the vehicle 1. The secondary battery may accumulate electric power to be supplied to the driving motor. The generator may generate electric power to be charged in the battery. Examples of the generator may include a motor and a fuel cell.

The vehicle 1 may include, as devices to be used in a driving control of the vehicle 1, the driving force source 9, an electric steering device 15, and a brake hydraulic control unit 20. The driving force source 9 may output the driving torque to be transmitted to a front wheel drive axle 5F and a rear wheel drive axle 5R via an unillustrated transmission, a front wheel differential mechanism 7F, and a rear wheel differential mechanism 7R. Driving of the driving force source 9 and the transmission may be controlled by a vehicle control device 41. The vehicle control device 41 may include one or more electronic control units (ECUs).

The electric steering device 15 may be provided on the front wheel drive axle 5F. The electric steering device 15 may include an unillustrated electric motor and an unillustrated gear mechanism. The electric steering device 15 may be controlled by the vehicle control device 41 to adjust steering angles of the left-front wheel 3LF and the right-front wheel 3RF. In manual driving, the vehicle control device 41 may control the electric steering device 15 based on a steering angle of a steering wheel 13 operated by a driver who drives the vehicle 1. In automatic driving, the vehicle control device 41 may control the electric steering device 15 based on a target steering angle set by an automatic driving control operation.

The vehicle 1 may have a brake system configured as a hydraulic brake system. The brake hydraulic control unit 20 may adjust a hydraulic pressure to be applied to brake calipers 17LF, 17RF, 17LR, and 17RR to generate braking force. The brake calipers 17LF, 17RF, 17LR, and 17RR may be provided at the left-front wheel 3LF, the right-front wheel 3RF, the left-rear wheel 3LR, and the right-rear wheel 3RR, respectively. In the following, the brake calipers 17LF, 17RF, 17LR, and 17RR may be collectively referred to as "brake calipers 17" unless a distinction is to be made between them. Driving of the brake hydraulic control unit 20 may be controlled by the vehicle control device 41. When the vehicle 1 is an electric vehicle or a hybrid electric vehicle, the brake hydraulic control unit 20 may be used together with a regenerative brake achieved by the driving motor.

The vehicle control device 41 may include one or more electronic control units that control driving of the driving force source 9, the electric steering device 15, and the brake hydraulic control unit 20. The driving force source 9 may output the driving torque for the vehicle 1. The electric steering device 15 may control the steering angle of the steering wheel 13 or a steered wheel. The brake hydraulic control unit 20 may control the braking force of the vehicle 1. In one example, the vehicle control device 41 may control the driving of the transmission that performs shifting of an output from the driving force source 9 and transmits the resultant output to the wheels 3. In the manual driving of the vehicle 1, the vehicle control device 41 may acquire information regarding an operation amount related to the driving performed by the driver, and may control the driving of the driving force source 9 that outputs the driving torque for the vehicle 1, the electric steering device 15 that controls the steering angle of the steering wheel 13 or the steered wheel, and the brake hydraulic control unit 20 that controls the braking force of the vehicle 1. In addition, the vehicle control device 41 may be configured to acquire information transmitted from the driving assistance apparatus 50, and may be configured to carry out an automatic driving control of the vehicle 1.

The vehicle 1 may also include forward view capturing cameras 31LF and 31RF, a driver capturing camera 33, and a vehicle state sensor 35. The forward view capturing cameras 31LF and 31RF may each capture a forward view of the vehicle 1 and generate image data. The driver capturing camera 33 may capture an image of the driver who drives the vehicle 1 and generate image data. The forward view capturing cameras 31LF and 31RF and the driver capturing camera 33 may each include an image sensor such as a charged-coupled device (CCD) or a complementary metal-oxide-semiconductor (CMOS). The forward view capturing cameras 31LF and 31RF and the driver capturing camera 33 may transmit the generated image data to the driving assistance apparatus 50.

In the vehicle 1 illustrated in FIG. 1, the forward view capturing cameras 31LF and 31RF may configure a stereo camera including a pair of left and right cameras. However, the forward view capturing cameras 31LF and 31RF may each be a monocular camera. In addition to the forward view capturing cameras 31LF and 31RF, the vehicle 1 may include, for example, any of a rearward view capturing camera, a left rearward view capturing camera, and a right rearward view capturing camera. The rearward view capturing camera may be provided in a rear part of the vehicle 1 and capture a rearward view of the vehicle 1. The left rearward view capturing camera may be provided on a side-view mirror 11L and capture a left rearward view of the vehicle 1. The right rearward view capturing camera may be provided on a side-view mirror 11R and capture a right rearward view of the vehicle 1.

The vehicle state sensor 35 may include one or more sensors that detect an operation state and behavior of the vehicle 1. The vehicle state sensor 35 may include, for example, one or more of a steering angle sensor, an accelerator position sensor, a brake stroke sensor, a brake pressure sensor, and an engine speed sensor. The sensors may each detect the operation state of the vehicle 1 such as the steering angle of the steering wheel 13 or the steered wheel, an accelerator position, an amount of a brake operation, or an engine speed. Moreover, the vehicle state sensor 35 may include, for example, one or more of a vehicle speed sensor, an acceleration rate sensor, and an angular speed sensor. The sensors may each detect the behavior of the vehicle 1 such as a vehicle speed, a longitudinal acceleration rate, a lateral acceleration rate, or a yaw rate. The vehicle state sensor 35 may also include a sensor that detects an operation performed on a turn signal lamp. The vehicle state sensor 35 may transmit a sensor signal including the detected information to the vehicle control device 41.

[2. Driving Assistance Apparatus]

[2-1. Configuration Example]

Figure 2:
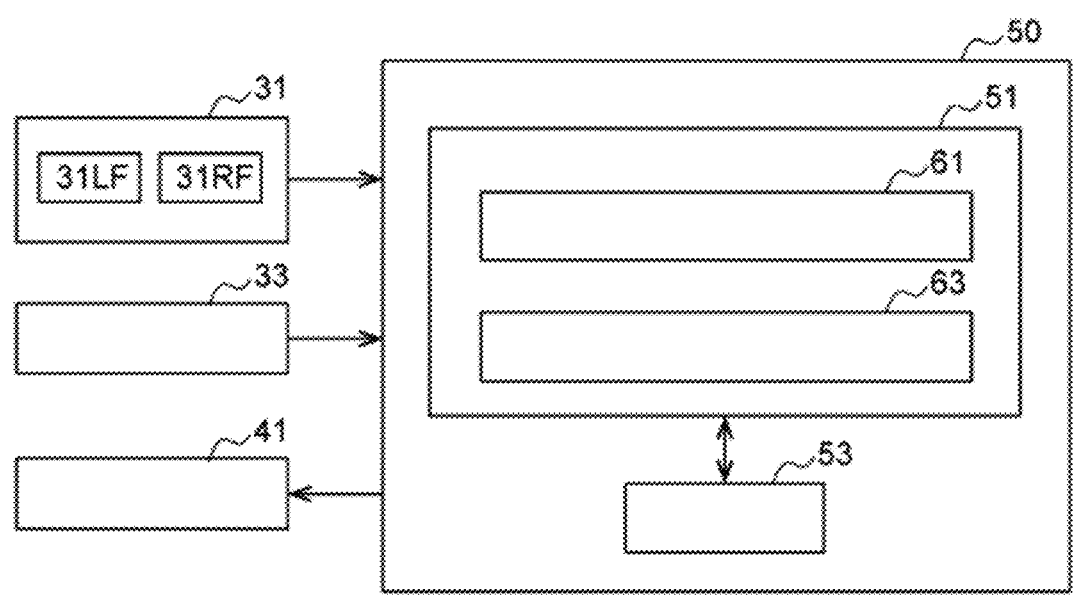
FIG. 2 is a block diagram illustrating a configuration example of the driving assistance apparatus in the example illustrated in FIG. 1.

FIG. 2 is a block diagram illustrating a configuration example of the driving assistance apparatus 50 in the example illustrated in FIG. 1. The driving assistance apparatus 50 may serve as an apparatus that estimates a vehicle weight of a surrounding vehicle by causing one or more processors to execute a computer program. The one or more processors may each include a central processing unit (CPU). The computer program may cause the one or more processors to perform an operation described later to be performed by the driving assistance apparatus 50. In one example, the computer program to be executed by the one or more processors may be contained in a non-transitory recording medium that serves as a storage 53 provided in the driving assistance apparatus 50. In one embodiment, the storage 53 may serve as "one or more memories". In another example, the computer program to be executed by the one or more processors may be contained in a non-transitory recording medium built in the driving assistance apparatus 50, or any non-transitory recording medium externally attachable to the driving assistance apparatus 50.

The non-transitory recording medium containing the computer program may be: a magnetic medium such as a hard disk, a floppy disk, or a magnetic tape; an optical recording medium such as a compact disk read only memory (CD-ROM), a digital versatile disk (DVD), or a Blu-ray (registered trademark); a magnetic-optical medium such as a floptical disk; a memory such as a random access memory (RAM) or a read only memory (ROM); a flash memory such as a universal serial bus (USB) memory or a solid state drive (SSD); or any other medium that is able to hold a program.

To the driving assistance apparatus 50, the forward view capturing cameras 31LF and 31RF, the driver capturing camera 33, and the vehicle state sensor 35 may be coupled via a dedicated line, or a communication system such as a controller area network (CAN) or a local interconnect network (LIN). In the following, the forward view capturing cameras 31LF and 31RF may be collectively referred to as "forward view capturing cameras 31" unless a distinction is to be made between them. The vehicle control device 41 may also be coupled to the driving assistance apparatus 50 via a dedicated line, or a communication system such as a CAN or a LIN. Note that the driving assistance apparatus 50 is not limited to an electronic control unit mounted on the vehicle 1, and may be a terminal device such as a smartphone or a wearable device.

The driving assistance apparatus 50 may include a processing unit 51 and the storage 53. The processing unit 51 may include one or more processors. The one or more processors may each be, for example, a CPU. A portion or all of the processing unit 51 may be configured to be updatable by, for example, firmware. A portion or all of the processing unit 51 may be, for example, a program module to be executed in accordance with a command from a device such as a CPU. The storage 53 may include a memory such as a RAM or a ROM. The storage 53 may be communicably coupled to the processing unit 51. Note that the storage 53 is not particularly limited in number or type. The storage 53 may hold a computer program to be executed by the processing unit 51, and information including, for example, various parameters to be used in calculation processing, detection data, and calculation results.

[2-2. Operational Configuration]

As illustrated in FIG. 2, the processing unit 51 of the driving assistance apparatus 50 may include a path setting unit 61 and a driving assistance unit 63. The path setting unit 61 and the driving assistance unit 63 may be implemented by execution of the computer program by the one or more processors each including, for example, a CPU. Note that a portion or all of the path setting unit 61 and the driving assistance unit 63 may be configured by an analog circuit. In the following, an operation of each of the path setting unit 61 and the driving assistance unit 63 of the processing unit 51 will be briefly described, and then a process operation will be described in further detail.

The path setting unit 61 may set a path for the vehicle 1 when the vehicle 1 enters an intersection in the following manner based on information acquired from a device inside the vehicle 1 via the above-described communication system and information acquired from a device outside the vehicle 1 via a communication system such as a network communication. The intersection may be a crossroad or a T-intersection. The device inside the vehicle 1 may be, for example, the forward view capturing cameras 31.

To allow the vehicle 1 to travel along the path set by the path setting unit 61, the driving assistance unit 63 may output information for leading or guiding the vehicle 1 to an unillustrated audio output device or an unillustrated image output device. Non-limiting examples of the audio output device may include a speaker. Non-limiting examples of the image output device may include a head up display. In an alternative example, to allow the vehicle 1 to automatically travel along the path set by the path setting unit 61, the driving assistance unit 63 may output automatic driving control target information to the vehicle control device 41.

The operation of the path setting unit 61 in the example embodiment will be described below in further detail; however, a detailed description of the operation of the driving assistance unit 63 to achieve the determined path will be omitted because a publicly known technique is applicable therefor.

[3. Example Process to be Performed by Path Setting Unit]

In the following, an example process to be performed by the driving assistance apparatus will be described with reference to an example where the intersection is a T-intersection and where the vehicle 1 is to turn left at the T-intersection.

In the example embodiment, the path setting unit 61 of the driving assistance apparatus 50 may present a position of the vehicle 1, an attitude of the vehicle 1, and a traveling path for the vehicle 1. The path setting unit 61 may thereby incline a vehicle body based on a viewing angle of the driver upon entering the intersection (the crossroad or the T-intersection) or at a stopping or waiting position on the entry road and thereby prevent an increase in a turning amount of a line of sight for checking an approaching obstacle upon merging.

For example, the path setting unit 61 may calculate a lateral direction of the vehicle 1 and an inclination angle of the vehicle 1 upon entering the intersection based on a condition for preventing an increase in turning radius, preventing the vehicle 1 from coming into contact with an obstacle, and preventing the vehicle 1 from entering into an opposing lane, and also based on a condition regarding an upper limit of the inclination angle of the vehicle 1 that prevents an increase in the turning amount of the line of sight.

Figure 3:
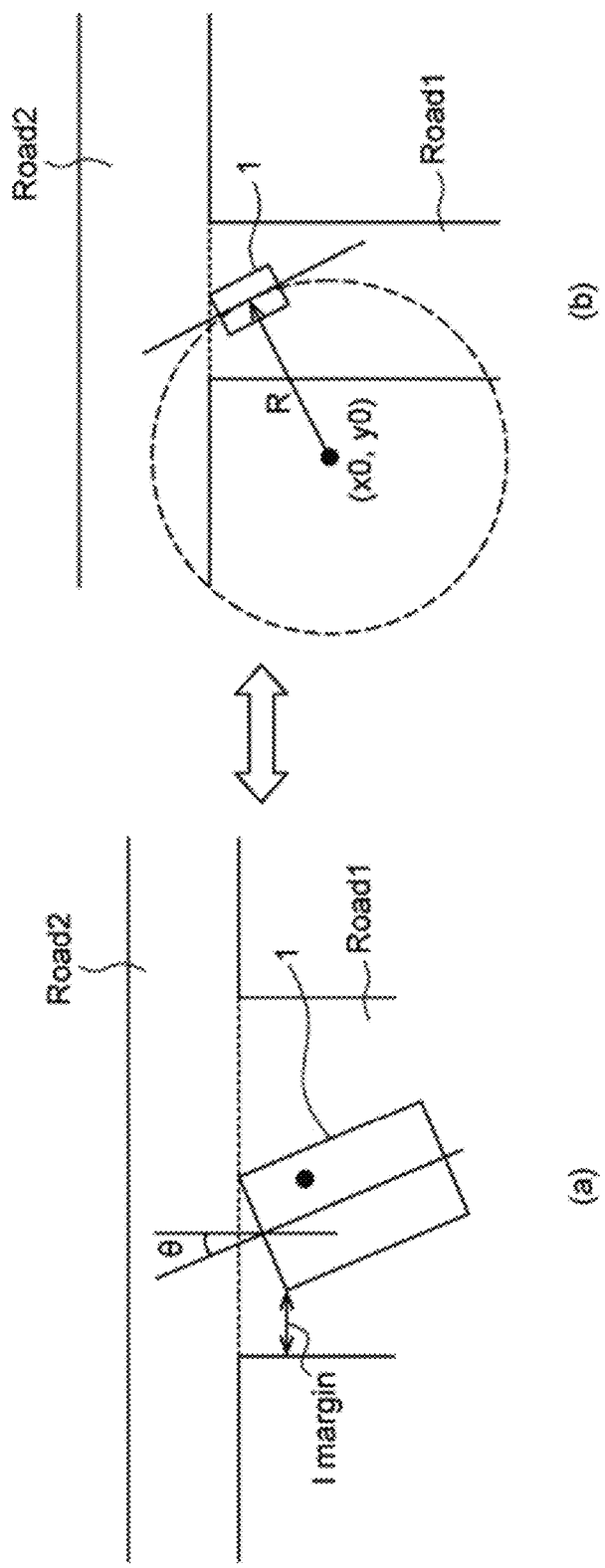
FIG. 3 is a diagram illustrating a relationship of a lateral position of the vehicle and an inclination angle of the vehicle upon entering an intersection, to a turning center and a turning radius.

FIG. 3 is a diagram illustrating a relationship of the lateral position of the vehicle 1 and the inclination angle of the vehicle 1 with respect to a turning center and a turning radius at a time when the vehicle 1 enters the intersection. Referring to (a) and (b) of FIG. 3, the pre-merging waiting position ($l_{margin}$, θ) may be a position at which the vehicle 1 is stopped or waits when the vehicle 1 enters the intersection (the T-intersection in the illustrated example), that is, in a state where a front end of the vehicle 1 traveling on an entry road Road1 is in contact with a merging road Road2. Based on the assumption that a traveling path of the vehicle 1 merging from the entry road Road1 into the merging road Road2 forms a circular arc having a turning radius R, determining the above-described pre-merging waiting position ($l_{margin}$, θ) may be equivalent to determining a turning center ($x_0$, $y_0$) and the turning radius R on a two-dimensional plane including the intersection. That is, if the three parameters, i.e., the coordinate $x_0$ of the turning center, the coordinate $y_0$ of the turning center, and the turning radius R are determined, it may be possible to determine the pre-merging waiting position ($l_{margin}$, θ).

In this case, determining the coordinates $x_0$ and $y_0$ of the turning center to achieve a greater turning radius R and a minimum blind spot at the entry road may involve determining optimum values on three-dimensional parameter axes. This can lead to an enormous amount of calculation. In addition, the priority between maximizing the turning radius R and minimizing the blind spot may be to be determined in advance.

To solve the above-described issue, the parameters may be determined by the following procedure in the example embodiment. In the following, a "lateral" direction may refer to an extending direction of the merging road Road2, and a "vertical" direction may refer to an extending direction of the entry road Road1.

(1) Determine a turning end position on the merging road Road2 and determine a lateral position $x_0$ of the turning center.

(2) Determine a lateral position $l_{margin}$ and an inclination angle θ at the pre-merging waiting position on the entry road Road1.

Figure 4:
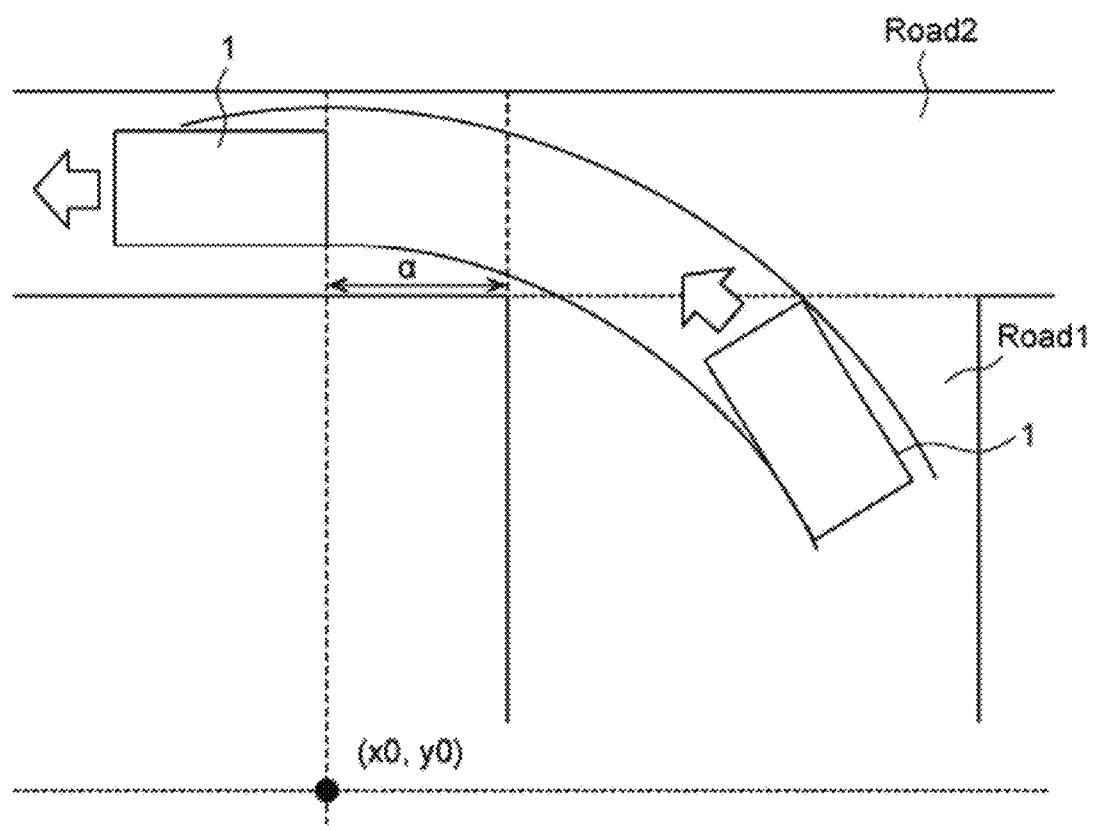
FIG. 4 is a diagram for describing determination of a turning end position.

(1) Determination of the Turning End Position and the Lateral Position $x_0$ of the Turning Center First, the turning end position may be determined. The turning end position may be a position at which the steering angle of the vehicle 1 returns to 0° on the merging road Road2 after the vehicle 1 merges into the merging road Road2. Based on the assumption that the traveling path of the vehicle 1 forms a circular arc from a pre-merging waiting position to the turning end position, the lateral position $x_0$ of the turning center may be identified by determining a distance α, as illustrated in FIG. 4. The distance α may be a distance from a left end of the entry road Road1 to a rear end of the vehicle 1 at a time when the vehicle 1 finishes turning.

The distance α may be determined by a combination of a road width $l_p$ of the merging road Road2, a road width $l_{all}$ of the entry road Road1, and a vehicle width of the vehicle 1.

Therefore, the value of the distance α calculated in advance may be put in a table in association with the values of the road widths and the vehicle width, and such a table may be stored. The greater the distance α is, the farther the lateral position of the turning center from the vehicle 1 may be, and the greater the turning radius may be. Accordingly, for example, to achieve more moderate merging, the value of the distance α to be calculated in advance may be increased.

Figure 5:
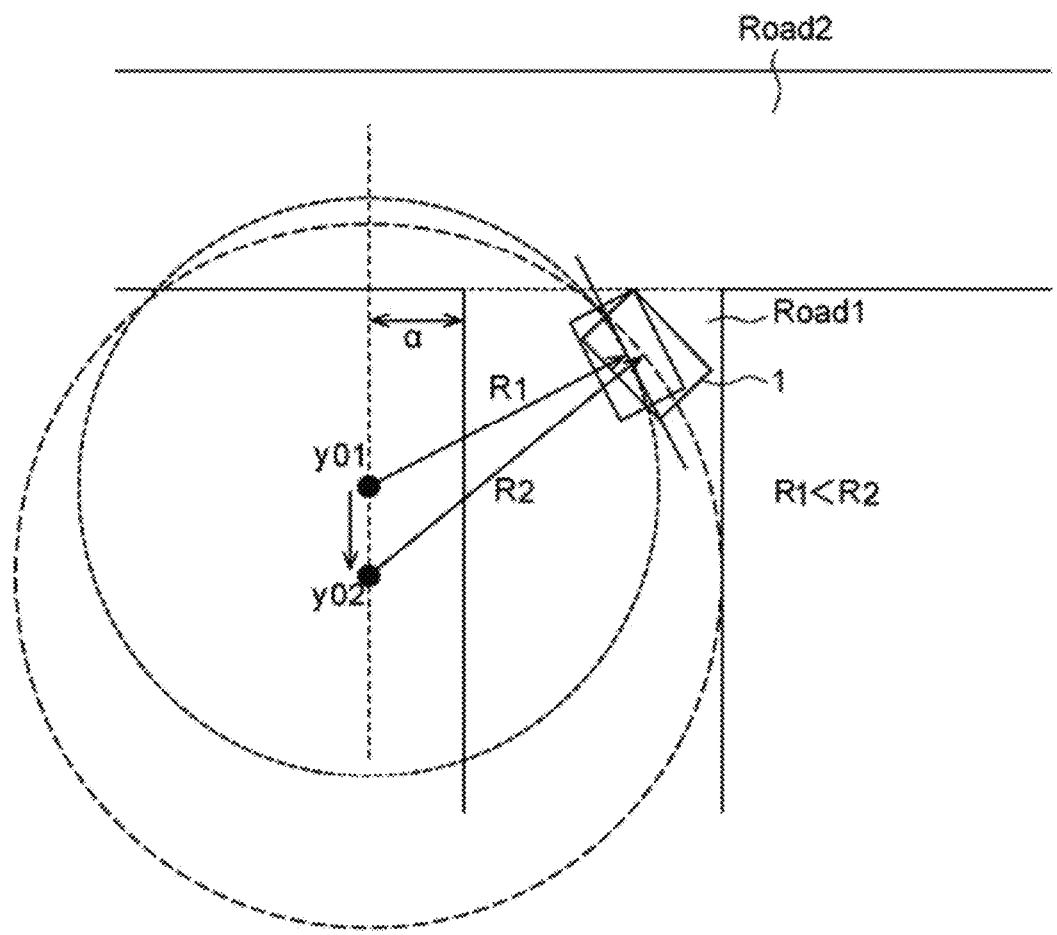
FIG. 5 is a diagram illustrating the turning center and the turning radius in a case where the inclination angle of the vehicle is increased.

(2) Determination of the Lateral Position $l_{margin}$ and the Inclination Angle θ at the Pre-Merging Waiting Position After the distance α representing the turning end position is determined by (1) described above, the lateral position $l_{margin}$ and the inclination angle θ of the vehicle 1 may be determined, by the following calculation process, that maximize the field of view while satisfying a constrained condition. As described above, determining the lateral position $l_{margin}$ and the inclination angle θ may be equivalent to identifying the rest of the parameters, i.e., the vertical position $y_0$ of the turning center and the turning radius R. Accordingly, if the lateral position $l_{margin}$ and the inclination angle θ are determined, the turning radius R may be logically determined. However, in one example, the inclination angle θ may be increased to widen the field of view. In this case, as illustrated in FIG. 5, the vertical position $y_0$ of the turning center may be set farther from the vehicle 1 ($y_{01} \rightarrow y_{02}$), and the turning radius R may be increased accordingly ($R_1 \rightarrow R_2$; $R_1 < R_2$).

A first constrained condition regarding the lateral position $l_{margin}$ and the inclination angle θ may be that the vehicle 1 is prevented from coming into contact with a border of the entry road Road1 and a border of the merging road Road2. For example, the first constrained condition may be that a rear-end left corner of the vehicle 1 is prevented from coming into contact with the border of the entry road Road1 (the intersection corner), and a front-end right corner of the vehicle 1 is prevented from coming into contact with the border of the merging road Road2 on the opposite side. This may be defined by an expression including the turning radius R. A second constrained condition may be that an increase in the turning amount of the line of sight is prevented by securing a predetermined distance or more between the border of the entry road Road1 and the vehicle 1. As will be described below in further detail, a viewing angle may be calculated using the lateral position $l_{margin}$ and the inclination angle θ as variables to employ the lateral position $l_{margin}$ and the inclination angle θ corresponding to the maximum viewing angle.

Figure 6:
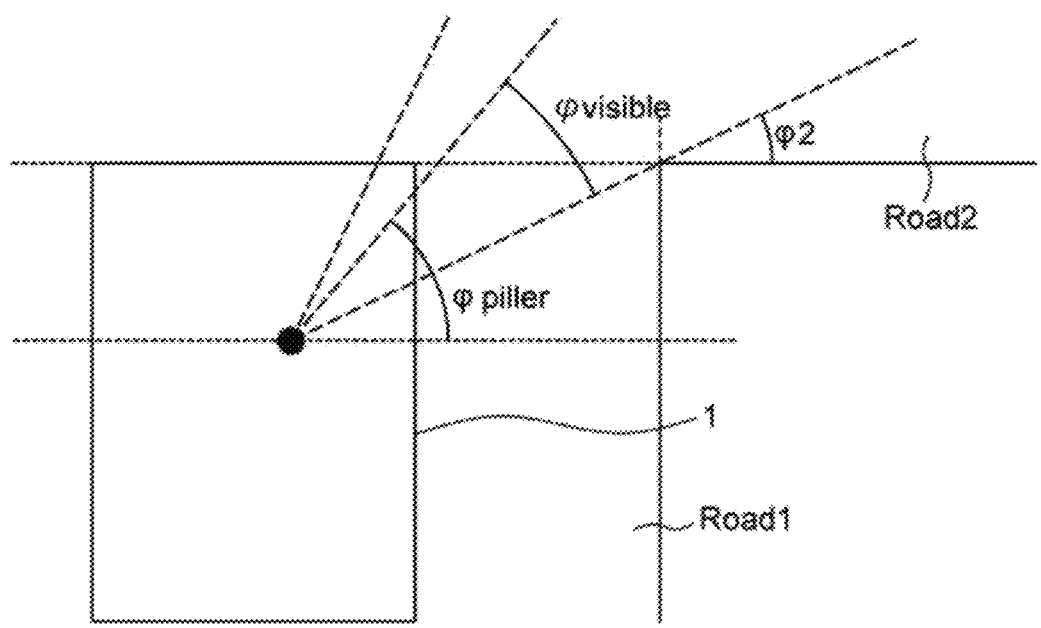
FIG. 6 is a diagram for describing an angle of a viewable range at a pre-merging waiting position.
Figure 7:
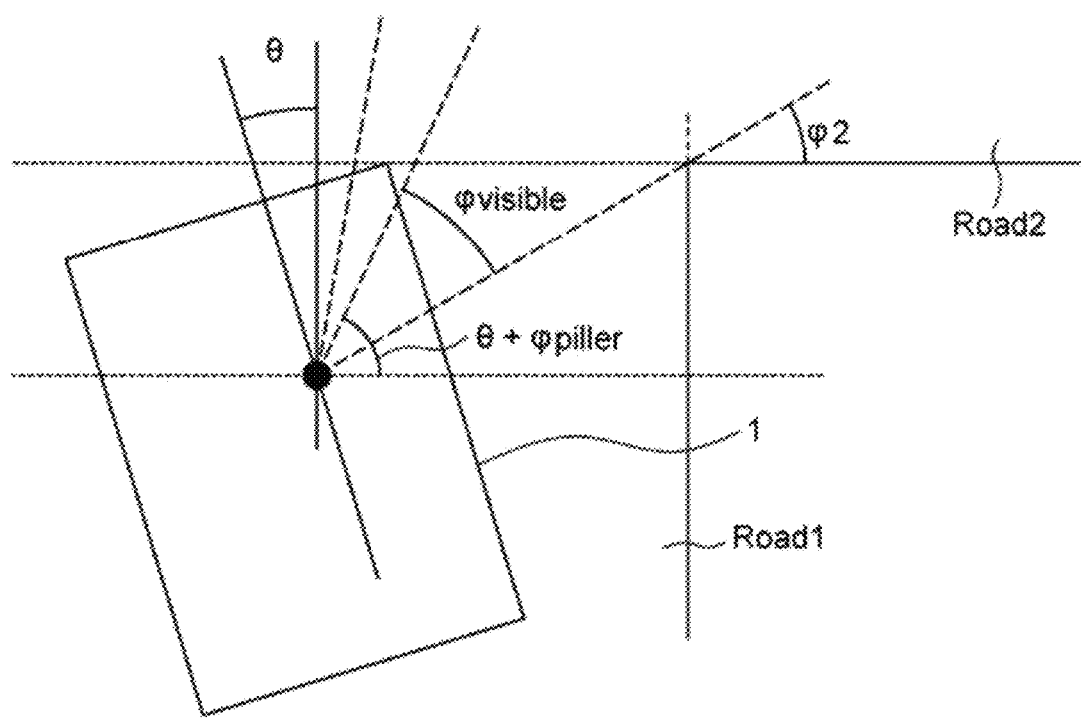
FIG. 7 is a diagram for describing the angle of the viewable range at the pre-merging waiting position.

Described below is a method of calculating the viewing angle using the lateral position $l_{margin}$ of the vehicle 1 and the inclination angle θ of the vehicle 1 at the pre-merging waiting position. The method to be described below may be based on the assumption that the vehicle 1 is to wait on the entry road Road1 at a position where the front end of the vehicle 1 is in contact with the border of the merging road Road2 (that is, where the front end of the vehicle 1 does not exceed the border of the merging road Road2). In this case, derived may be an expression for calculating an angle $\varphi_{visible}$ of a viewable range illustrated in FIGS. 6 and 7. The angle visible of the viewable range may be an angle of a viewable range between a region that is a blind spot from a position of the driver at the pre-merging waiting position caused by an A-pillar of the vehicle 1 and a region that is a blind spot from the position of the driver at the pre-merging waiting position caused by the intersection corner. The A-pillar may be any of pillars on both sides of a windshield. In one embodiment, the intersection corner may serve as a "blind spot forming object". Note that "$\varphi_{pillar}$" in the drawings may represent an angle of a range in which the A-pillar is present based on a right-left direction of the driver as a reference.

Note that the path setting unit 61 may be configured to calculate the position of the driver based on a correlation between information regarding a position of the driver's head detected by the driver capturing camera 33 and an installation position of the driver capturing camera 33 in the vehicle 1. For example, information regarding the installation position of the driver capturing camera 33 on a plane defined by two axes, i.e., a vehicle length direction and a vehicle width direction, may be stored in the storage 53 in advance. Based on the relationship between the information regarding the position of the driver's head detected by the driver capturing camera 33 and the position of the driver capturing camera 33, the path setting unit 61 may calculate the position of the driver.

Figure 8:
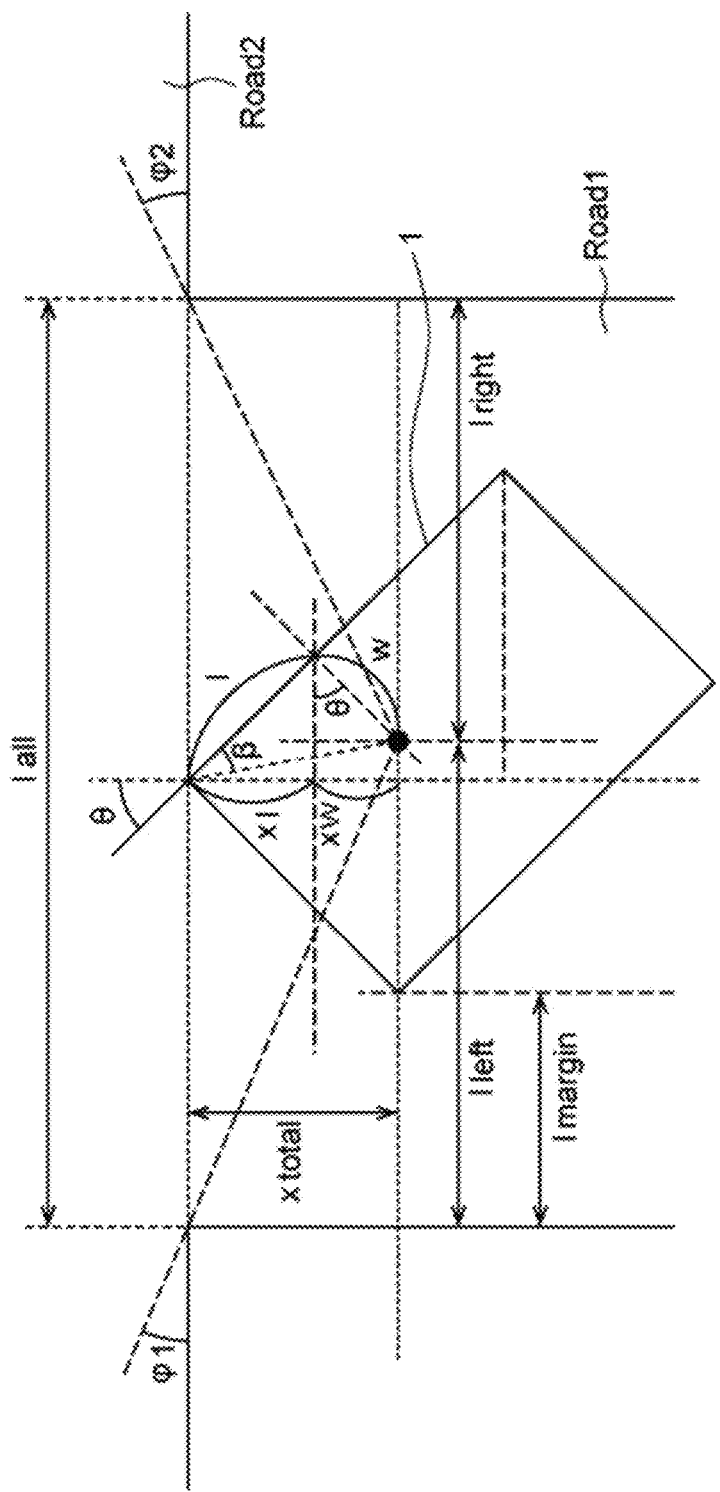
FIG. 8 is a diagram for describing a blind spot caused by an intersection corner on a right side of a driver.

As illustrated in FIG. 8, an angle $\varphi_2$ of a blind spot on the right side of the driver caused by the intersection corner may be represented by the following expression (1), where $x_{total}$ is a distance from the border of the merging road Road2 to the driver, and $l_{all}$ is a road width of the entry road Road1. Here, the distance $x_{total}$ may be represented by the following expression (2), and an angle β may be represented by the following expression (3). Further, distances $l_{left}$, $l_{right}$, and $l_{all}$ may satisfy the following expression (4), where $l_{left}$ is a distance from the driver to the left end of the entry road Road1, and $l_{right}$ is a distance from the driver to the right end of the entry road Road1. In addition, the angle $\varphi_2$ of the blind spot may be calculated by the following expression (5). Accordingly, the angle $\varphi_{visible}$ of the viewable range may be calculated by the following expression (6). Note that h is the vehicle width of the vehicle 1, d is a body length of the vehicle 1, l is a distance from the front end of the vehicle 1 to the driver, and w is a distance from a right side end of the vehicle 1 to the driver.

$$\phi_2 = \tan^{-1}\left(\frac{x_{total}}{l_{right}}\right) \qquad (1)$$

$$x_{total} = x_l + x_w \qquad (2)$$

$$= l \cdot \cos\theta + w \cdot \sin\theta$$

$$= \sqrt{l^2 + w^2}\,(\cos\beta \cdot \cos\theta + \sin\beta \cdot \sin\theta)$$

$$= \sqrt{l^2 + w^2}\,\cos(\beta - \theta)$$

$$\tan(\beta) = \frac{w}{l} \qquad (3)$$

$$l_{left} = l_{margin} + h\cos\theta - \sqrt{l^2 + w^2}\,\sin(\beta - \theta), \qquad (4)$$

$$l_{right} = l_{all} - l_{left}$$

$$\phi_2(l_{margin}, \theta) = \tan^{-1}\left(\frac{\sqrt{l^2+w^2}\,\cos(\beta-\theta)}{l_{all} - l_{margin} - h\cos\theta + \sqrt{l^2+w^2}\,\sin(\beta-\theta)}\right) \qquad (5)$$

$$\phi_{visible}(l_{margin}, \theta) = \qquad (6)$$

$$(\phi_{pillar} + \theta) - \tan^{-1}\left(\frac{\sqrt{l^2+w^2}\,\cos(\beta-\theta)}{l_{all} - l_{margin} - h\cos\theta + \sqrt{l^2+w^2}\,\sin(\beta-\theta)}\right)$$

Note that although the description above relates to conditional expressions for the right side of the vehicle body, similar conditional expressions may be used to calculate an angle of a viewable range on the left side of the vehicle body.

Figure 9:
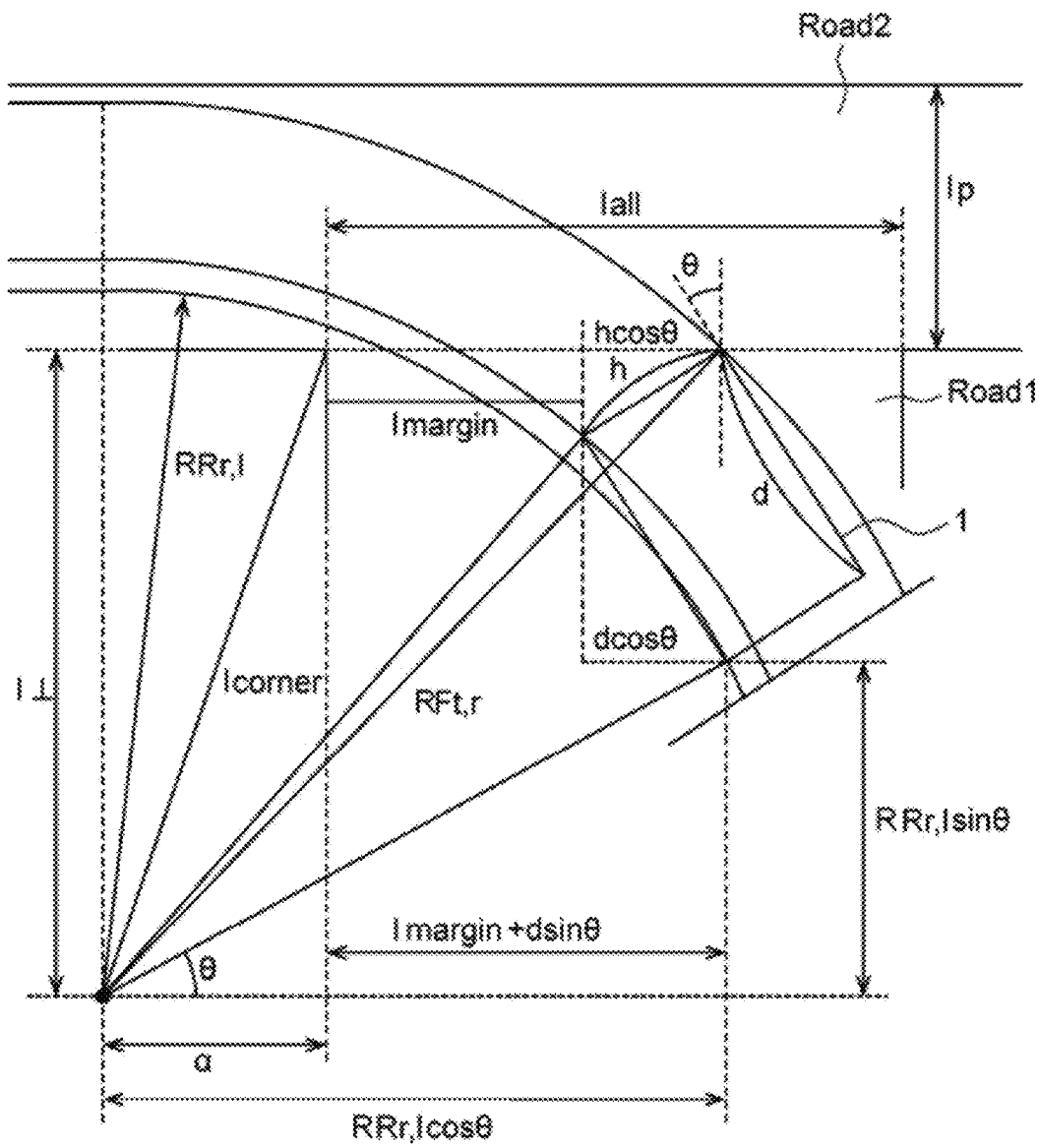
FIG. 9 is a diagram for describing a condition for preventing the vehicle from coming into contact with a border of an entry road and a border of a merging road.

The foregoing "condition for preventing the vehicle 1 from coming into contact with the border of the entry road Road1 and the border of the merging road Road2" may be described as follows. In a case illustrated in FIG. 9, a condition for preventing the rear-end left corner of the vehicle 1 from coming into contact with the intersection corner upon turning may be represented by the following expression (7). Substituting the following expression (8), which represents a distance $l_{corner}$ from the turning center to the intersection corner, into the expression (7) may result in the following expression (9). Because the values on the left-hand side and on the right-hand side of the expression (9) are both positive values, squaring the values on both sides may result in the following expression (10). Solving the expression (10) for a turning radius $R_{Rr,l}$ of the rear-end left corner of the vehicle 1 may result in the following expression (11). When the inclination angle θ is 0, the turning radius $R_{Rr,l}$ may be expressed by the following expression (12). To secure a sufficient distance to avoid contact, an additional distance A may be added to the condition represented by the expression (7), resulting in the following expression (13).

$$l_{corner} < R_{Rr,1} \quad (7)$$

$$l_{corner} = \sqrt{\alpha^2 + (R_{Rr,1}\sin\theta + d\cos\theta + h\sin\theta)^2} \quad (8)$$

$$\sqrt{\alpha^2 + (R_{Rr,1}\sin\theta + d\cos\theta + h\sin\theta)^2} < R_{Rr,1} \quad (9)$$

$$\alpha^2 + (R_{Rr,1}\sin\theta + d\cos\theta + h\sin\theta)^2 < R_{Rr,1}^2 \quad (10)$$

$$R_{Rr,1} > (d\cos\theta + h\sin\theta)\frac{\sin\theta}{\cos^2\theta} - \sqrt{\left((d\cos\theta + h\sin\theta)\frac{\sin\theta}{\cos^2\theta}\right)^2 + \frac{(d\cos\theta + h\sin\theta)^2 + \alpha^2}{\cos^2\theta}} \quad (11)$$

$$R_{Rr,1} > \sqrt{d^2 + \alpha^2} \quad (12)$$

$$l_{corner} + A < R_{Rr,1} \quad (13)$$

The condition for preventing the front-end right corner of the vehicle 1 from coming into contact with the border of the merging road Road2 on the opposite side upon turning may be represented by the following expression (14). A turning radius $R_{Ft,r}$ of the front-end right corner of the vehicle 1 may be represented by the following expression (15) using the turning radius $R_{Rr,l}$ of the rear-end left corner, the vehicle width h of the vehicle 1, and the body length d of the vehicle 1. Substituting the expression (15) into the expression (14) may result in the following expression (16). Solving the expression (16) for the turning radius $R_{Rr,l}$ of the rear-end left corner of the vehicle 1 may result in the following expression (17).

$$R_{Pt,r} < R_{Rr,1}\sin\theta + d\cos\theta + l_p \quad (14)$$

$$R_{Pt,r} = \sqrt{(R_{Rr,1} + h)^2 + d^2} \quad (15)$$

$$\sqrt{(R_{Rr,1} + h)^2 + d^2} < R_{Rr,1}\sin\theta + d\cos\theta + h\sin\theta + l_p \quad (16)$$

$$R_{Rr,1} < \frac{-h + \sin\theta(d\cos\theta + h\sin\theta + l_p)}{\cos^2\theta} + \sqrt{\left(\frac{-h + \sin\theta(d\cos\theta + h\sin\theta + l_p)}{\cos^2\theta}\right)^2 + \frac{(d\cos\theta + h\sin\theta + l_p)^2 - (h^2 + d^2)}{\cos^2\theta}} \quad (17)$$

Combining the respective two conditions represented by the expressions (11) and (17) may result in the following expression (18). Here, the turning radius $R_{Rr,l}$ of the rear-end left corner of the vehicle 1 may be represented by the following expression (19) using the lateral position $l_{margin}$ of the vehicle at the pre-merging waiting position, the inclination angle θ of the vehicle 1 at the pre-merging waiting position, and the distance α. The "condition for preventing the vehicle 1 from coming into contact with the border of the entry road Road1 and the border of the merging road Road2" may thus be represented by the following expression (20) using the lateral position $l_{margin}$ and the inclination angle θ. Based on the expression (20), a combination of the inclination angle θ and the lateral position $l_{margin}$ that allows for a path avoiding contact in relation to the inclination angle θ may be determined.

$$(d\cos\theta + h\sin\theta) + \frac{\sin\theta}{\cos^2\theta} - \sqrt{\left((d\cos\theta + h\sin\theta) + \frac{\sin\theta}{\cos^2\theta}\right)^2 + \frac{(d\cos\theta + h\sin\theta)^2 + \alpha^2}{\cos^2\theta}} < R_{Rr,1} < \frac{-h + \sin\theta(d\cos\theta + h\sin\theta + l_p)}{\cos^2\theta} + \sqrt{\left(\frac{-h + \sin\theta(d\cos\theta + h\sin\theta + l_p)}{\cos^2\theta}\right)^2 + \frac{(d\cos\theta + h\sin\theta + l_p)^2 - (h^2 + d^2)}{\cos^2\theta}} \quad (18)$$

$$R_{Rr,1} = \frac{\alpha + l_{margin} + d\sin\theta}{\cos\theta} \quad (19)$$

$$-\alpha - d\sin\theta + \frac{(d\cos\theta + h\sin\theta)\sin\theta}{\cos\theta} - \cos\theta\sqrt{\left((d\cos\theta + h\sin\theta)\frac{\sin\theta}{\cos^2\theta}\right)^2 + \frac{(d\cos\theta + h\sin\theta)^2 + \alpha^2}{\cos^2\theta}} < l_{margin} < -\alpha - d\sin\theta + \frac{-h + \sin\theta(d\cos\theta + h\sin\theta + l_p)}{\cos\theta} + \cos\theta\sqrt{\left(\frac{-h + \sin\theta(d\cos\theta + h\sin\theta + l_p)}{\cos^2\theta}\right)^2 + \frac{(d\cos\theta + h\sin\theta + l_p)^2 - (h^2 + d^2)}{\cos^2\theta}} \quad (20)$$

Figure 10:
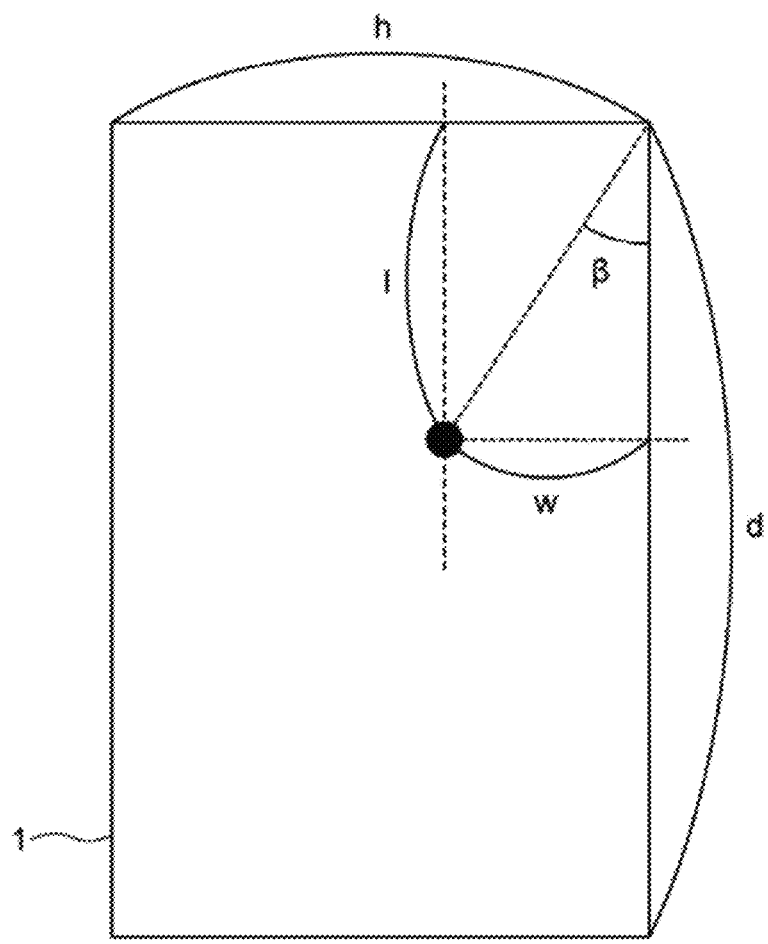
FIG. 10 is a diagram illustrating dimensions regarding the vehicle.

Next, a description is provided of calculations regarding the turning amount of the line of sight for confirming an approaching obstacle upon merging, i.e., calculations regarding a turning back angle $\varphi_B$ from the front. As illustrated in FIG. 10, a vehicle state at the pre-merging waiting position and a vehicle state at a merging middle position may be modeled as FIGS. 11 and 12, respectively, where h is the vehicle width of the vehicle 1, d is the body length of the vehicle 1, 1 is the distance from the front end of the vehicle 1 to the driver, w is the distance from the right side end of the vehicle 1 to the driver, and B is an angle of the driver viewed from the front-end right corner of the vehicle 1. The pre-merging waiting position may be a position where the vehicle 1 is to stop with the front end of the vehicle 1 being in contact with the merging road Road2. The merging middle position may be a position where the driver reaches a border between the entry road Road1 and the merging road Road2.

Figure 11:
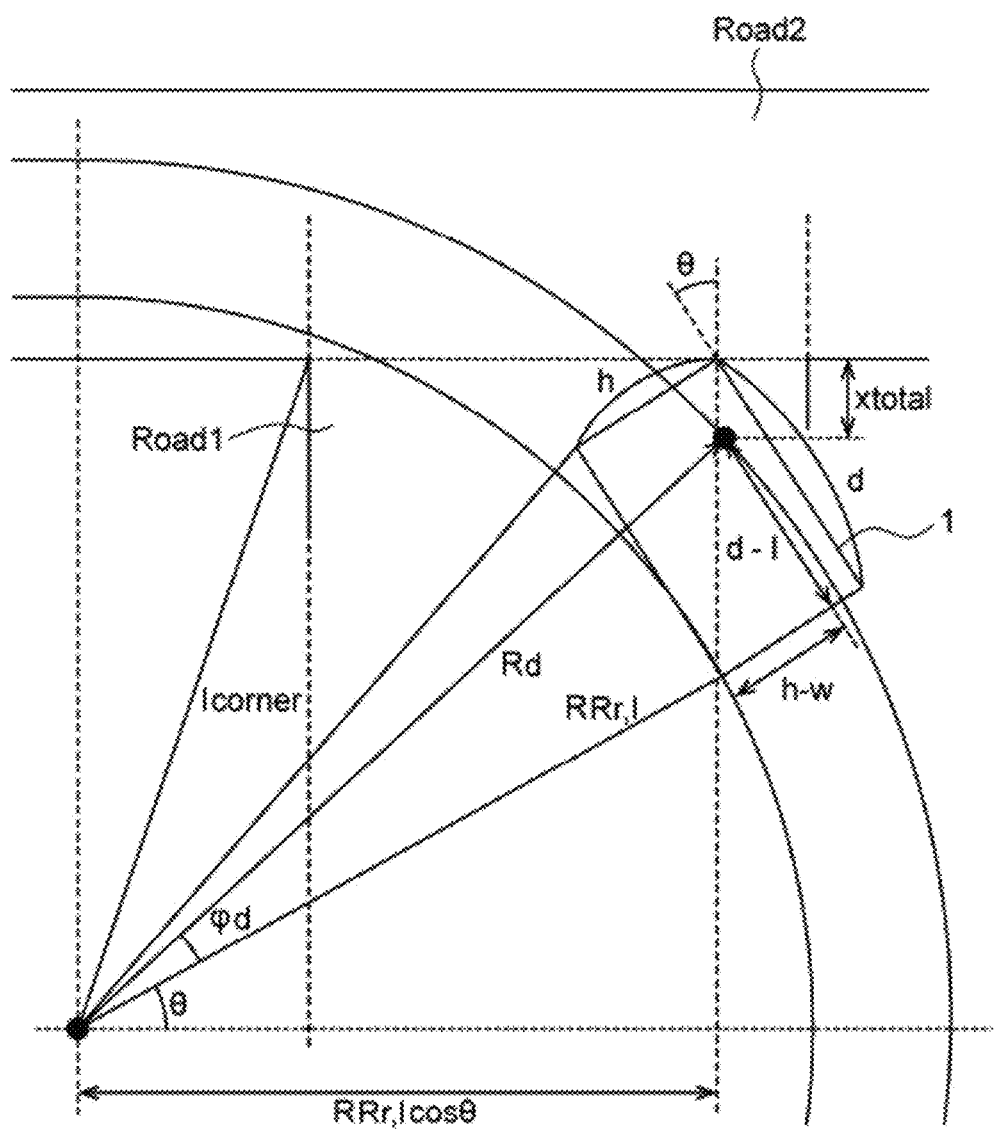
FIG. 11 is a diagram illustrating a model of a vehicle state at the pre-merging waiting position.
Figure 12:
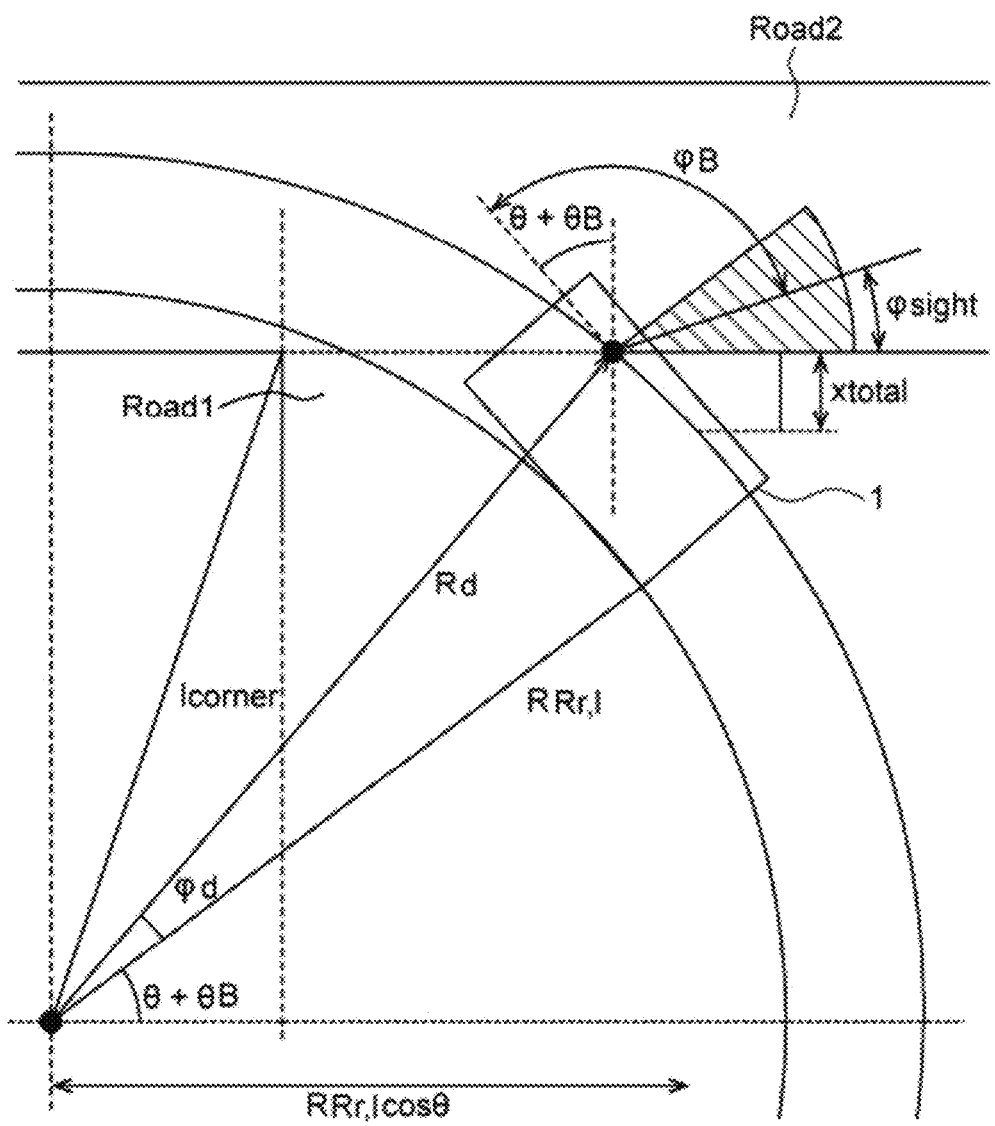
FIG. 12 is a diagram illustrating a model of the vehicle state at a merging middle position.

In the above-described models, transition from the state illustrated in FIG. 11 to the state illustrated in FIG. 12 may involve a movement of the driver by $x_{total}$ in the vertical direction. Accordingly, the following expression (21) may hold, where Rd is a distance from the turning center to the driver (the turning radius of the driver). Solving the expression (21) for an inclination angle $\theta+\theta_B$ of the vehicle 1 in the state illustrated in FIG. 12 may result in the following expression (22). Substituting the foregoing expression (19) and the following expressions (23), (24), and (25) may allow the turning back angle $\varphi_B$ to be represented by the following expression (26) using the inclination angle θ at the pre-merging waiting position, the inclination angle $\theta_B$ at the merging middle position, an angle $\varphi_{sight}$ (a value given in advance) of a field-of-view range on one side, and the lateral position $l_{margin}$.

$$R_d \sin(\theta_B + \theta + \phi_d) - R_d \sin(\theta + \phi_d) = x_{total} \quad (21)$$

$$\theta + \theta_B = \sin^{-1}\left[\frac{x_{total}}{R_d} + \sin(\theta + \phi_d)\right] - \phi_d \quad (22)$$

$$R_d^2 = \{R_{Rr,l} + (h-w)\}^2 + (d-l)^2 \quad (23)$$

$$\phi_d = \tan^{-1}\left[\frac{d-l}{\{R_{Rr,l} + (h-w)\}^2}\right] \quad (24)$$

$$x_{total} = \sqrt{l^2 + w^2} \cos(\beta - \theta) \quad (25)$$

$$\phi_B = \frac{\pi}{2} + \theta_B + \theta - \phi_{sight} \quad (26)$$

Figure 13:
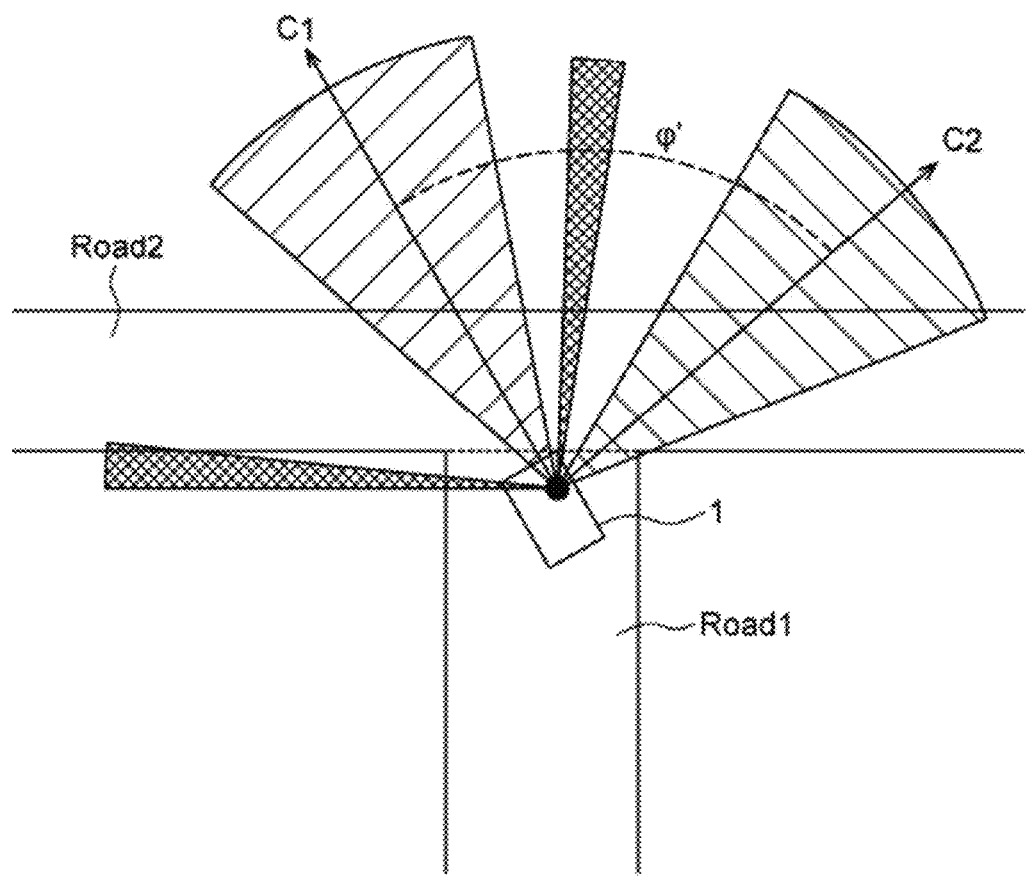
FIG. 13 is a diagram illustrating a turning back angle in the vehicle state illustrated in FIG. 11.
Figure 14:
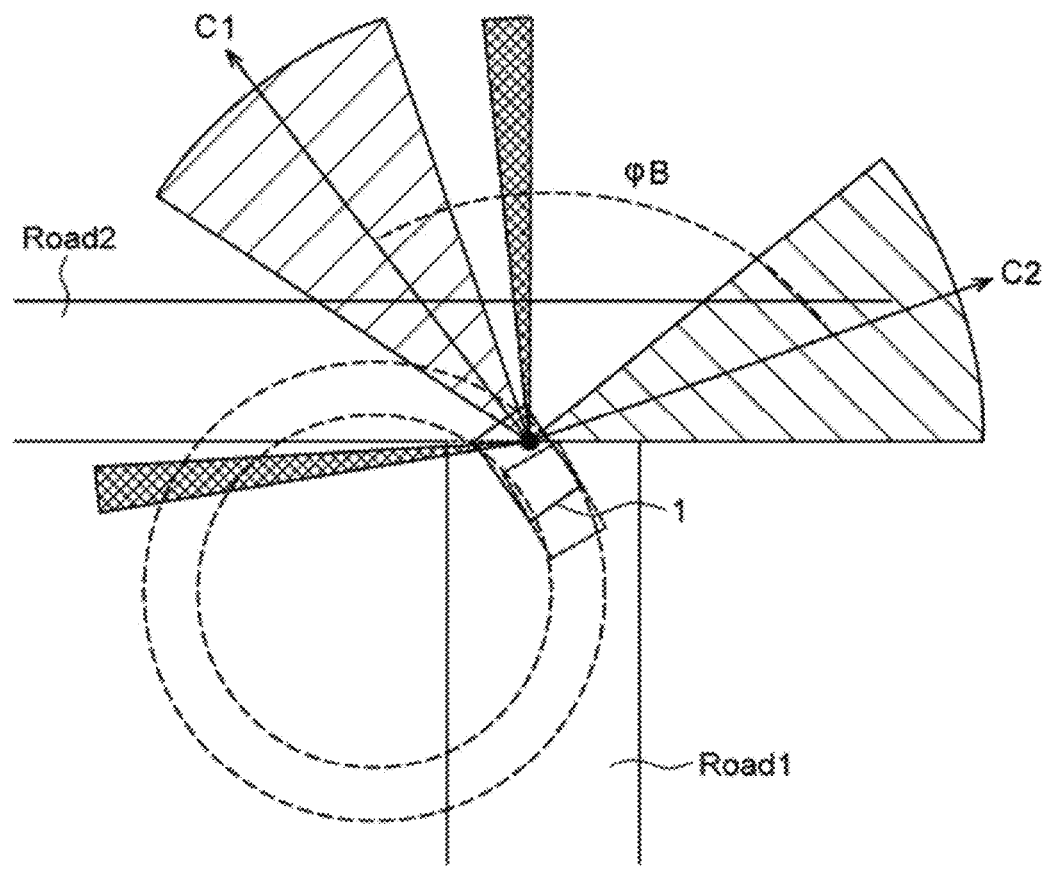
FIG. 14 is a diagram illustrating a turning back angle in the vehicle state illustrated in FIG. 12.

FIGS. 13 and 14 illustrate turning back angles φ' and $\varphi_B$ of the driver from the front in the above-described states illustrated in FIGS. 11 and 12, respectively. In further detail, FIG. 13 illustrates the turning back angle φ' at the pre-merging waiting position, and FIG. 14 illustrates the turning back angle $\varphi_B$ at the merging middle position. The turning back angles φ' and $\varphi_B$ may each be an angle between a viewing angle center line $C_1$ (the front-rear direction of the vehicle 1) of the driver looking at the front and a viewing angle center line $C_2$ of the driver confirming the right side, i.e., an inclination of the viewing angle center line $C_2$ from the front-rear direction of the vehicle 1. To prevent an increase in the turning amount of the line of sight, the path of the vehicle 1 may be set so that the turning back angles φ' and $\varphi_B$ each become a predetermined angle or less. For example, the lateral position $l_{margin}$ of the vehicle 1 and the inclination angle θ of the vehicle 1 may be set so that the turning back angles φ' and $\varphi_B$ each become an upper-limit value $\varphi_{max}$ or less.

The turning back angle φ' at the pre-merging waiting position may be smaller than the turning back angle $\varphi_B$ at the merging middle position. Therefore, it may substantially be sufficient that the lateral position $l_{margin}$ and the inclination angle θ are determined so that the turning back angle $\varphi_B$ calculated by the foregoing expression (26) does not exceed the upper-limit value $\varphi_{max}$. If the combination of the lateral position $l_{margin}$ and the inclination angle θ that satisfies the condition is absent, the upper-limit value $\varphi_{max}$ may be increased little by little (for example, by 2° at a time) to recalculate the combination of the lateral position $l_{margin}$ and the inclination angle θ until the combination satisfying the condition is present.

As illustrated in FIG. 14, the turning back angle $\varphi_B$ may be an inclination, with respect to the front-rear direction of the vehicle 1, of the viewing angle center line $C_2$ of the driver of the vehicle 1 viewing a region that has been a blind spot, at a position where the region having been the blind spot becomes viewable from the driver. The above-described region may be a region that has been the blind spot from the driver of the vehicle 1 traveling on the entry road Road1. Such a blind spot may be caused by the blinding spot forming object (the intersection corner) present on a turning outer side of the vehicle 1. The driving assistance apparatus 50 may set the path for the vehicle 1 so that the turning back angle $\varphi_B$ becomes the predetermined angle (the upper-limit value $\varphi_{max}$) or less.

Figure 15:
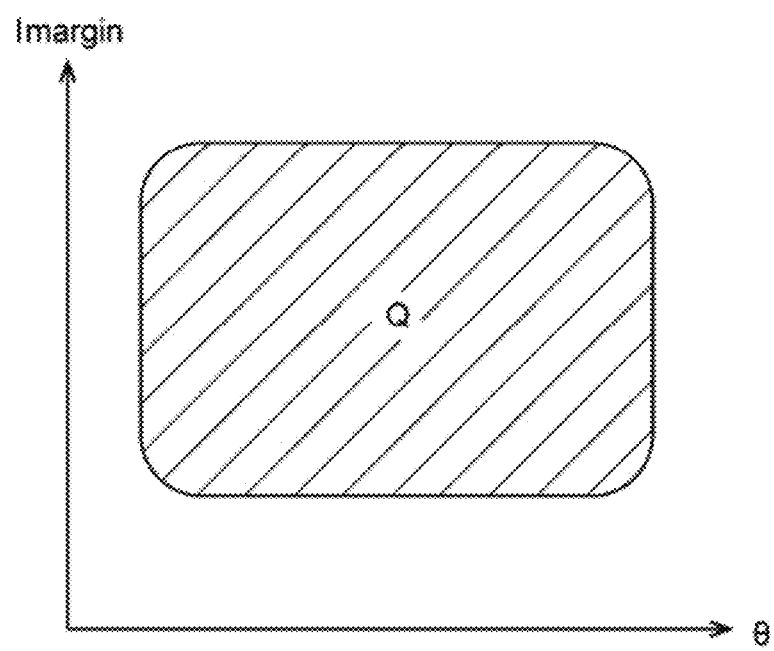
FIG. 15 is a diagram for conceptually describing how to determine the lateral position and the inclination angle of the vehicle according to one example embodiment of the disclosure.
Figure 16:
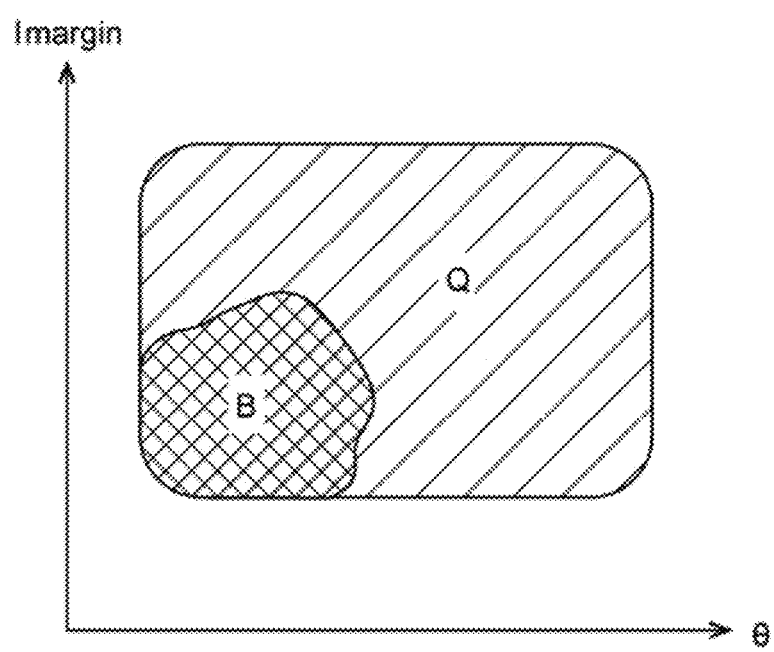
FIG. 16 is a diagram for conceptually describing how to determine the lateral position of the vehicle and the inclination angle of the vehicle according to one example embodiment of the disclosure.

FIGS. 15 and 16 are diagrams for conceptually describing how to determine the lateral position $l_{marging}$ and the inclination angle θ. First, for example, the foregoing expression (20) may be used to calculate a range of the lateral position $l_{marging}$ and the inclination angle θ satisfying the "condition for preventing the vehicle 1 from coming into contact with the border of the entry road Road1 and the border of the merging road Road2", which may result in a range Q illustrated in FIG. 15. In one embodiment, the above-described range may serve as a "first settable range". Thereafter, for example, the foregoing expression (26) may be used to identify a range of the lateral position $l_{marging}$ and the inclination angle θ satisfying the "condition for preventing an increase in the turning amount of the line of sight" within the range Q, which may result in a range B illustrated in FIG. 16. In one embodiment, the above-described range may serve as a "second settable range". Further, for example, the foregoing expression (6) may be used to select, within the range B, the combination of the lateral position $l_{marging}$ and the inclination angle θ that maximizes the angle $\varphi_{visible}$ of the viewable range illustrated in FIGS. 6 and 7.

Such a method may narrow a range for the parameters in a stepwise manner, making it possible to prevent the calculations from being enormous in amount. In addition, the stepwise application of the conditions makes clear the priority between the maximization of the turning radius R (preventing an increase in the turning radius, contact of the vehicle with an obstacle, and entry of the vehicle into an opposing lane) and the minimization of the blind spot (the upper limit of the inclination angle of the vehicle that prevents an increase in the turning amount of the line of sight).

Figure 17:
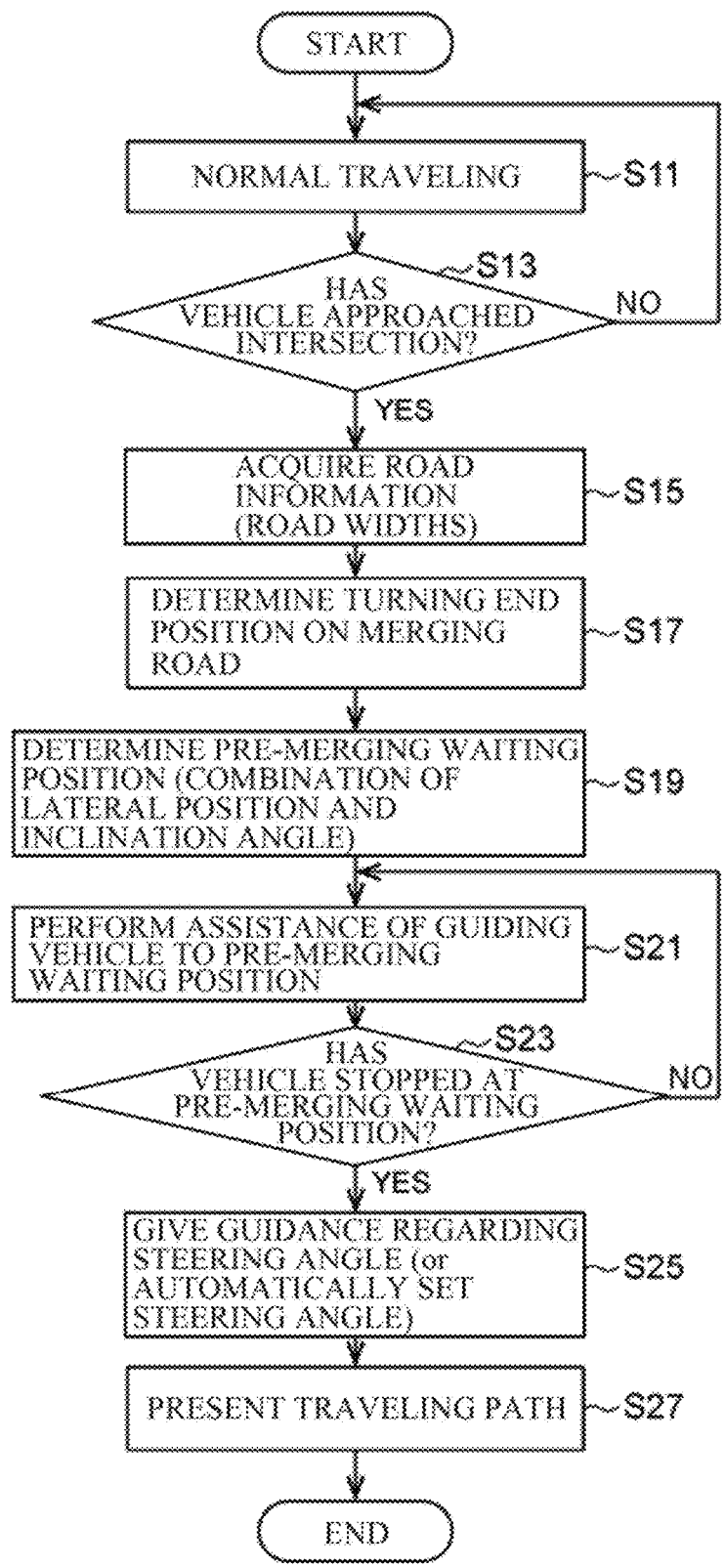
FIG. 17 is a flowchart illustrating an example of a process to be executed by the driving assistance apparatus according to one example embodiment of the disclosure.

FIG. 17 is a flowchart illustrating an example of a process to be performed by the driving assistance apparatus according to the example embodiment of the disclosure. The process illustrated in the flowchart may be executed substantially constantly while the vehicle 1 is being driven, or may be executed while an operation switch related to the assistance process of the example embodiment is on.

First, while the vehicle 1 is performing normal traveling (step S11), the path setting unit 61 of the driving assistance apparatus 50 may determine whether the vehicle 1 has approached an intersection such as a crossroad or a T-intersection (step S13). In one example, whether the vehicle 1 has approached an intersection may be determined by determining whether the position of the vehicle 1 has approached a position of the intersection on map data based on a navigation system. In another example, whether the vehicle 1 has approached an intersection may be determined based on an image captured by a camera. If it is not determined that the vehicle 1 has approached the intersection (step S13: NO), the process may return to step S11 and the path setting unit 61 may repeatedly perform the determination in step S13 until the vehicle 1 approaches the intersection.

If it is determined that the vehicle 1 has approached the intersection (step S13: YES), the path setting unit 61 may then acquire road information (step S15). The road information may include respective road widths $l_p$ of the entry road Road1 and the merging road Road2. For example, the path setting unit 61 may use a publicly known method to acquire the road information including the respective road widths $l_p$ of the entry road Road1 and the merging road Road2. In one example, the path setting unit 61 may acquire the respective road widths $l_p$ of the entry road Road1 and the merging road Road2 as road information related to a front region in the traveling direction of the vehicle 1 from a server outside the vehicle 1. In another example, the path setting unit 61 may acquire the respective road widths $l_p$ of the entry road Road1 and the merging road Road2 from high resolution map data in which road information including road widths is recorded.

Thereafter, the path setting unit 61 may determine the turning end position on the merging road Road2, i.e., a position at which the steering angle of the vehicle 1 returns to 0° on the merging road Road2 after the vehicle 1 merges into the merging road Road2 (step S17). For example, as described above, the path setting unit 61 may refer to the table stored in advance in which the values of the distance α are associated with the values of the road widths and the values of the vehicle widths in advance. The distance α may be the distance from the left end of the entry road Road1 to the rear end of the vehicle 1 when the vehicle 1 finishes turning. The path setting unit 61 may thus determine the distance α.

Thereafter, the path setting unit 61 may determine the pre-merging waiting position of the vehicle 1 at a time when the vehicle 1 merges into the merging road Road2 from the entry road Road1, based on the foregoing expressions (20) and (26) (step S19). For example, based on the above-described expressions (20) and (26), the path setting unit 61 may determine the combination of the lateral position $l_{margin}$ and the inclination angle θ that satisfies the "condition for preventing the vehicle 1 from coming into contact with the border of the entry road Road1 and the border of the merging road Road2" and the "condition for preventing an increase in the turning amount of the line of sight" and that maximizes the angle $\varphi_{visible}$ of the viewable range.

After the combination of the lateral position $l_{margin}$ and the inclination angle θ is determined by the path setting unit 61, the driving assistance unit 63 may perform assistance of guiding the vehicle 1 to the determined pre-merging waiting position (step S21). In one example, to allow the vehicle 1 to have an attitude corresponding to the lateral position $l_{margin}$ and the inclination angle θ, the driving assistance unit 63 may output a target path for the vehicle 1 leading to the pre-merging waiting position to the image output device for the driver, or may output an instruction regarding a steering operation to the audio output device or the image output device for the driver. Non-limiting examples of the image output device may include a head up display. Non-limiting examples of the audio output device may include a speaker.

Thereafter, the driving assistance unit 63 may determine whether the vehicle 1 has stopped at the pre-merging waiting position (step S23). In one example, the driving assistance unit 63 may estimate a position and an attitude of the vehicle 1 based on a steering operation history and an acceleration and deceleration operation history of the vehicle 1 (a self-position estimation process). In another example, the driving assistance unit 63 may estimate the position and the attitude of the vehicle 1 with use of a navigation system. If the vehicle 1 is not determined as having stopped at the pre-merging waiting position (step S23: NO), the driving assistance unit 63 may cause the process to return to step S21, and may continue the driving assistance until the vehicle 1 stops at the pre-merging waiting position.

If the vehicle 1 is determined as having stopped at the pre-merging waiting position (step S23: YES), the driving assistance unit 63 may give a guidance or an instruction to the driver to allow the steering angle to be a steering angle achieving the turning radius R as a condition set upon determining the lateral position $l_{margin}$ and the inclination angle θ in step S19 (step S25). In one example, the driving assistance unit 63 may output information for guiding the steering operation to the image output device such as the head up display, or may output an instruction regarding the steering operation to the audio output device such as the speaker or the image output device. In another example, the driving assistance unit 63 may set the target steering angle and a target acceleration rate to allow the vehicle 1 to turn along the target path by automatic driving, and may send information regarding the set target steering angle and the set target acceleration rate to the vehicle control device 41.

Thereafter, the driving assistance unit 63 may present, to the driver, a traveling path leading to the turning end position (step S27). For example, the driving assistance unit 63 may output information regarding a path to travel to the image output device such as the head up display.

Through the above-described process, the driving assistance apparatus 50 may determine a target operation of the vehicle 1 at the intersection in accordance with the physical law, and may thereby assist the driving of the vehicle 1. This makes it possible to allow the driver of the vehicle 1 to safely merge the vehicle 1 into the merging road Road2 from the entry road Road1 while preventing the vehicle 1 from coming into contact with an obstacle, preventing the vehicle 1 from entering into the opposing lane, and preventing an increase in the turning amount of the line of sight.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, although all of the operations to be performed by the driving assistance apparatus are performed in the own vehicle in the example embodiment described above, an embodiment of the disclosure is not limited thereto. For example, some or all of the operations to be performed by the driving assistance apparatus may be performed in a server apparatus that is communicable with the driving assistance apparatus via a mobile body communication system, and the driving assistance apparatus may be configured to perform transmission and reception of data between the driving assistance apparatus and the server apparatus.

As used herein, the term "collision" may be used interchangeably with the term "contact".

The driving assistance apparatus 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving assistance apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driving assistance apparatus 50 illustrated in FIG. 2.

The invention claimed is:

1. A driving assistance apparatus configured to assist driving of a vehicle when the vehicle travels from an entry road, turns at a crossroad or a T-intersection, and travels into a merging road, the driving assistance apparatus comprising:
   one or more processors; and
   one or more memories communicably coupled to the one or more processors, wherein
   the one or more processors are configured to:
      set a merging middle position based on information regarding a position of a head of a driver of the vehicle and information regarding the entry road and the merging road, the merging middle position being a position at which a region becomes viewable from the driver of the vehicle, the region being a blind spot from the driver of the vehicle traveling on the entry road, the blind spot being caused by a blind spot forming object present on a turning outer side of the vehicle;
      set a path for the vehicle that allows an inclination to be less than or equal to a predetermined angle at the merging middle position, the inclination being an inclination of a viewing angle center line of the driver viewing the region having been the blind spot with respect to a front-rear direction of the vehicle.

2. The driving assistance apparatus according to claim 1, wherein
   the one or more processors are configured to:
      calculate a first settable range of a lateral position of the vehicle and an inclination angle of the vehicle at a pre-merging waiting position of the vehicle on a condition that the vehicle is prevented from coming into contact with a border of the entry road and a border of the merging road;
      calculate a second settable range of the lateral position of the vehicle and the inclination angle of the vehicle within the first settable range on a condition that the inclination is less than or equal to the predetermined angle; and
      set the path for the vehicle based on the lateral position of the vehicle and the inclination angle of the vehicle selected within the second settable range.

3. The driving assistance apparatus according to claim 2, wherein
   the one or more processors are configured to:
      determine a turning end position at which a steering angle of the vehicle returns to 0 degrees on the merging road; and
      calculate the first settable range based on an assumption that a traveling path of the vehicle from the pre-merging waiting position to the turning end position forms a circular arc.

4. The driving assistance apparatus according to claim 2, wherein the one or more processors are configured to select, within the second settable range, the lateral position of the vehicle and the inclination angle of the vehicle that maximize an angle of a viewable range, the viewable range being a range between a region that is a blind spot from the driver at the pre-merging waiting position caused by a pillar of the vehicle and a region that is a blind spot from the driver at the pre-merging waiting position caused by the blind spot forming object.

5. The driving assistance apparatus according to claim 2, wherein the one or more processors are configured to, when the lateral position of the vehicle and the inclination angle of the vehicle are absent within the second settable range, increase the predetermined angle and recalculate the second settable range.

6. A vehicle comprising the driving assistance apparatus according to claim 1.

7. A non-transitory tangible computer readable recording medium containing a computer program to be applied to a driving assistance apparatus, the driving assistance apparatus being configured to assist driving of a vehicle when the vehicle travels from an entry road, turns at a crossroad or a T-intersection, and travels into a merging road, the computer program causing, when executed by one or more processors, the one or more processors to implement a method, the method comprising:
   setting a merging middle position based on information regarding a position of a head of a driver of the vehicle and information regarding the entry road and the merging road, the merging middle position being a position at which a region becomes viewable from the driver of the vehicle, the region being a blind spot from the driver of the vehicle traveling on the entry road, the blind spot being caused by a blind spot forming object present on a turning outer side of the vehicle; and
   setting a path for the vehicle that allows an inclination to be less than or equal to a predetermined angle at the merging middle position, the inclination being an inclination of a viewing angle center line of the driver viewing the region having been the blind spot with respect to a front-rear direction of the vehicle.

* * * * *